United States Patent Office 3,564,750
Patented Feb. 23, 1971

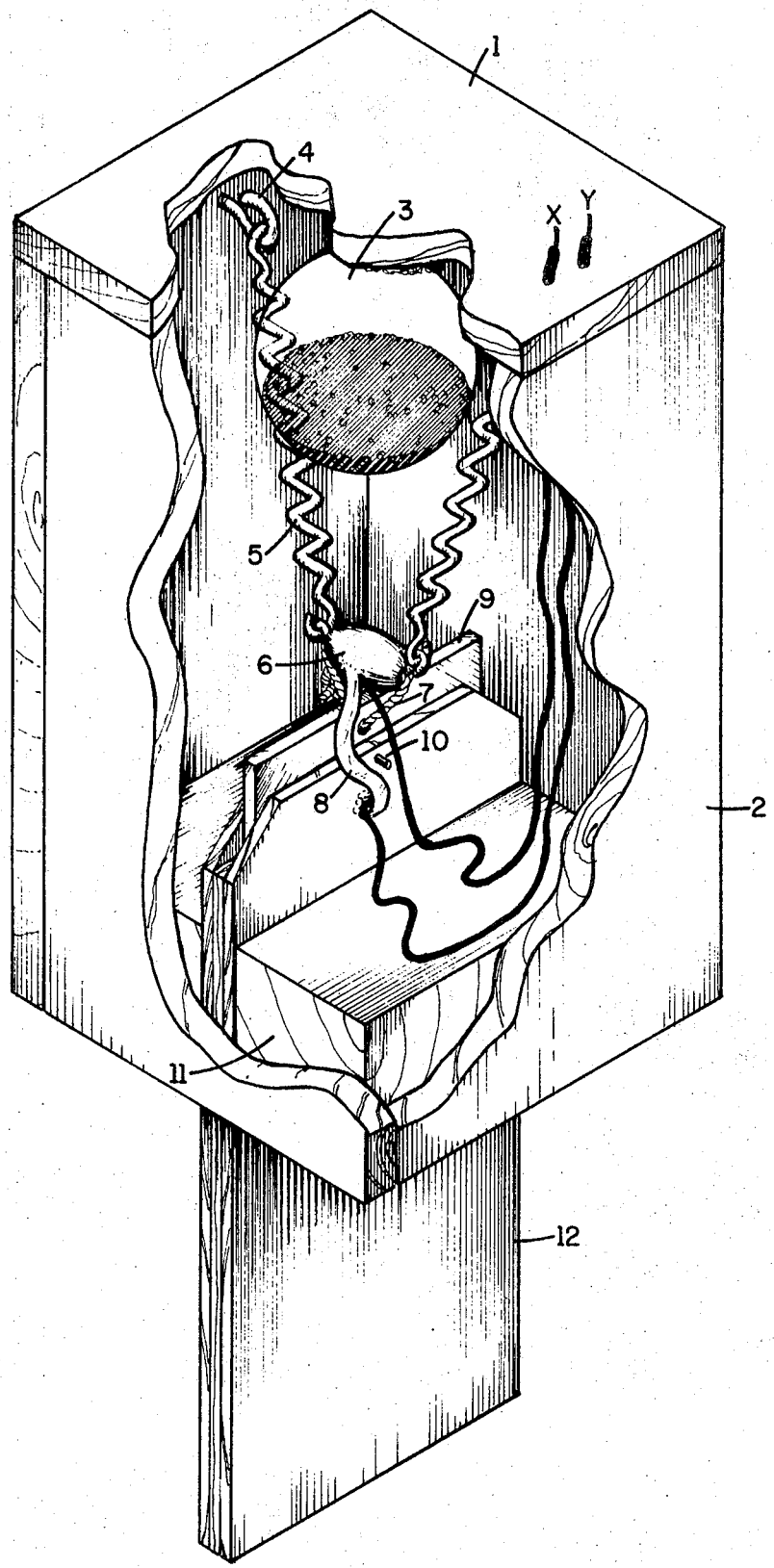

3,564,750
SUBTERRANEAN TERMITE DETECTOR-
EXTERMINATOR
John Burgess, 91–638 Aikanaka Road,
Ewa Beach, Hawaii 96706
Filed Aug. 6, 1968, Ser. No. 750,678
Int. Cl. A01m 1/20
U.S. Cl. 43—107       2 Claims

ABSTRACT OF THE DISCLOSURE

A structure for use in protecting wooden parts of buildings against subterranean termites in the form of a baited trap, which when actuated, discharges an insecticide onto the termites. A frangible insecticide container is mounted in an enclosed chamber and a projectile is held under spring tension by consumable trigger means. When the trigger means is consumed by termites, the projectile is released and breaks the container to discharge the insecticide. A signal device is associated with the trap to indicate that the structure has been attacked by termites.

This invention relates to devices for use in protecting the wooden parts of buildings against subterranean termites; and the invention has reference, more particularly, to a device in the form of a baited trap, which when actuated by termites, discharges an insecticide and operates an electrical switch.

One object of this invention is to provide a simple and relatively inexpensive device for storing a frangible capsule containing an insecticide in the vicinity of the wooden structure to be protected; said device including means which is operative, when actuated, to automatically break or shatter the insecticide capsule, and thereupon expel the insecticide content onto intruding subterranean termites. It is known that subterranean termites return to their nests at intervals of five to eight hours. Termites with insecticide on their legs and bodies will inadvertently distribute particles of the insecticide throughout their nest and food supply causing eventual extermination of the nest population.

This invention has for another object to provide, in a device for the purposes mentioned above, a spring-actuated means by which an electro-mechanical switch is operative, when actuated, to automatically break electrical continuity. Said electro-mechanical switch may be monitored by an electrical continuity measuring instrument (e.g., an ohmmeter or a lamp wired in series with a battery), which when electrical discontinuity is shown, will indicate that said device has been attacked by termites.

Typically, said device should be installed just below ground level near the wooden structure to be protected against subterranean termites.

An illustrative embodiment of this invention is shown in the accompanying isometric drawing. The size of said device is not an important consideration.

Referring to the drawing, the frangible capsule 3 containing a suitable termite insecticide (e.g., copper arsenite powder) is preferably attached to the lower side of the top cover 1. The frangible capsule 3 may be enclosed by the top cover 1, four side covers 2, and the illustrated combination of the bottom cover 11 and bait assembly 12. Preferably, the bait assembly 12 extends downward and outside of the above-described enclosure to provide easy accessibility of the bait assembly 12 material to subterranean termites.

The bait assembly 12, pin release trigger 10, and alternate release trigger 9 are constructed of wood or other material with a cellulose content. The string release trigger 7 is constructed of cotton or other material with a cellulose content. It is known that termites consume materials containing cellulose; wood and cotton contain substantial amounts of cellulose.

The projectile 6 may be constructed of lead or any other material capable of fracturing the frangible capsule 3 when said projectile 6 is propelled into the frangible capsule 3 by the force imparted by the projectile springs 5 or any other convenient projectile-propelling means. The projectile springs 5 may be held under tension by attaching one end of the springs 5 to the spring fasteners 4 or any other convenient spring-fastening means and attaching the other ends of the springs 5 by convenient means to the projectile 6. The spring fasteners 4 are preferably attached by convenient means to the inside surface of the side covers 2. Preferably, the projectile 6 should be held away from the frangible capsule 3 by the string release trigger 7 such that the projectile springs 5 are under sufficient tension to propel the projectile 6 into the frangible capsule 3 when any one of the three release triggers 7, 9, or 10 is consumed and actuated by termites.

The alternate release trigger 9 material is preferably of narrower thickness than the bait assembly 12 material such that a slot in the upper bait assembly 12 may accommodate the alternate release trigger 9 which rests loosely in the slot and is held in position by the pin release trigger 10.

The pin release trigger 10 is preferably a small diameter peg which is placed in a tight-fit hole which extends through the slot portion of the upper bait assembly 12 and the alternate release trigger 9.

The detector switch 8 is preferably constructed of thin metal foil having a length of less than the distance of travel that the projectile 6 makes from the point of pre-actuation of the release triggers 7, 9, 10 to the point of projectile 6 impact with the frangible capsule 3. One end of the detector switch 8 material may be attached by convenient means to the projectile 6 and the other end preferably anchored by convenient means to the bait assembly 12 such that the detector switch 8 material will be forcibly severed when the projectile 6 is propelled into the frangible capsule 3. Continuity of the detector switch 8 may be monitored by electrical conducting wires X and Y attached by convenient means to the ends of the detector switch 8 material. Preferably, the electrical conducting wires X and Y should be of sufficient length to protrude through the top cover 1 such that the electrical continuity of the detector switch 8 may be conveniently monitored Any electrically-operated signal device (e.g., a lamp wired in series with a battery) may be attached to wires X and Y for the purpose of indicating switch operation.

In operation, a frangible capsule 3 containing an insecticide having been enclosed by a top cover 1, four side covers 2, a bottom cover 11, has a bait assembly 12 attached to the latter. The projectile 6 is lowered against the tension of the projectile springs 5, and held in such position by a string release trigger 7, which is held in position by the alternate release trigger 9. The trigger 9 is held in position by the pin release trigger 10, which is held in position by the bait assembly 12, and one end of the metal foil strip of the detector switch 8 is attached to the projectile 6 and the other end of said metal foil strip is attached to the bait assembly 12, thus setting the device ready for an insecticide discharge operation and an electrical circuit discontinuity operation.

In the event that subterranean termites enter the device and consume the pin release trigger 10 or the alternate release trigger 9 or the string release trigger 7, the projectile 6 is no longer held in position by the string release trigger 7 and the spring tension imparted by the projectile springs 5 propel the projectile 6 upward into the frangible capsule 3 thus fracturing said capsule 3 and releasing the insecticide content onto the intruding termites. The metal foil strip of the detector switch 8, being of insufficient length to follow the full distance of travel that the projectile 6 makes from the point of release to the point of impact with capsule 3, is forcibly severed, whereupon the electrical circuit through the electrical conducting wires X and Y is interrupted by the lack of electrical conduction through the severed metal foil strip of the detector switch 8.

It will be understood that various changes could be made in the above described constructions, and that widely different embodiments of this invention could be made without departing from the scope thereof as defined in the following claims. It is therefore intended that all matter contained in the foregoing description or shown in the accompanying drawing shall be interpreted as illustrative and not a limiting sense.

What I therefore claim and desire to secure by Letters Patent is:

1. A device for discharging insecticide onto subterranean termites, comprising an enclosed chamber having a frangible insecticed container suspended from a top wall thereof, a projectile propelling means comprising a projectile, a pair of springs having first ends attached to opposite side walls of said chamber with second ends secured to said projectile, triggering means for holding said propelling means under tension in the form of a consumable string release trigger, a consumable bait material in the shape of a flat board mounted within said chamber and extending outwardly thereof, a consumable flat trigger member mounted and held in a slot in the inner end of said bait material by a consumable pin extending through the bait material and flat member, said string release trigger engaging said flat member and being attached to said projectile, said propelling means being actuated when said string release trigger, said flat member, or said pin is consumed by termites to propel said projectile against said container, thus breaking said container and discharging insecticide into said chamber, a signal device for indicating that said chamber has been attacked by termites comprising an easily-breakable metal foil strip secured to said projectile and bait material with conducting wires connected to the ends of said foil strip and to a monitoring instrument.

2. The device of claim 1 wherein said bait material, string release trigger, flat member and pin are all constructed of cellulosic material.

References Cited

UNITED STATES PATENTS

| | | | |
|---|---|---|---|
| 1,815,652 | 7/1931 | Gring | 43—107X |
| 2,317,942 | 4/1943 | Sabini | 124—14X |
| 2,451,220 | 10/1948 | Hunt | 43—131 |
| 2,592,022 | 4/1952 | Gallant | 43—131 |

FOREIGN PATENTS 311,183    2/1919    Germany.

SAMUEL KOREN, Primary Examiner

D. J. LEACH, Assistant Examiner

U.S. Cl. X.R.

43—131, 132